United States Patent [19]
Idaszak

[11] 3,967,975
[45] July 6, 1976

[54] FLUIDIZATION APPARATUS
[75] Inventor: Leo R. Idaszak, Palos Heights, Ill.
[73] Assignee: CPC International Inc., Englewood Cliffs, N.J.
[22] Filed: Nov. 25, 1974
[21] Appl. No.: 526,784

[52] U.S. Cl................................. 127/23; 23/284; 23/288 S; 34/10; 34/57 A; 110/8 F; 127/38
[51] Int. Cl.²...................... C13K 1/06; C13L 1/10; F26B 17/10
[58] Field of Search............. 23/284, 288 S; 127/23, 127/38; 34/10, 57 A; 110/8 F

[56] References Cited
UNITED STATES PATENTS

| | | | |
|---|---|---|---|
| 2,845,368 | 7/1958 | Fredrickson | 127/23 X |
| 2,987,487 | 6/1961 | Stevens et al. | 23/288 S X |
| 3,411,465 | 11/1968 | Shirai | 110/8 F |

FOREIGN PATENTS OR APPLICATIONS

| | | | |
|---|---|---|---|
| 1,136,059 | 5/1957 | France | 127/38 |

*Primary Examiner*—Morris O. Wolk
*Assistant Examiner*—Michael S. Marcus
*Attorney, Agent, or Firm*—Albert P. Halluin

[57] ABSTRACT

Apparatus for carrying out fluidized operations including a housing defining an upper chamber and a lower chamber, with each of the chambers containing agitating means therein to insure a high degree of homogeneity in each of the chambers, a plurality of tubes enclosed in a jacket positioned between the upper and lower chambers and communicating therewith, the tubes providing large heat transfer surfaces, inlet means to supply a fluidizable material to the one chamber and outlet means to remove fluidizable material from the other chamber, and means to supply a fluidizing gas to the lower chamber whereby the fluidizing gas passes upwardly through the lower chamber and through the tubes into the upper chamber while fluidizing the material in each of the upper chamber, the tubes and the lower chamber. The apparatus of the invention is particularly well suited for converting starches to dextrin.

11 Claims, 3 Drawing Figures

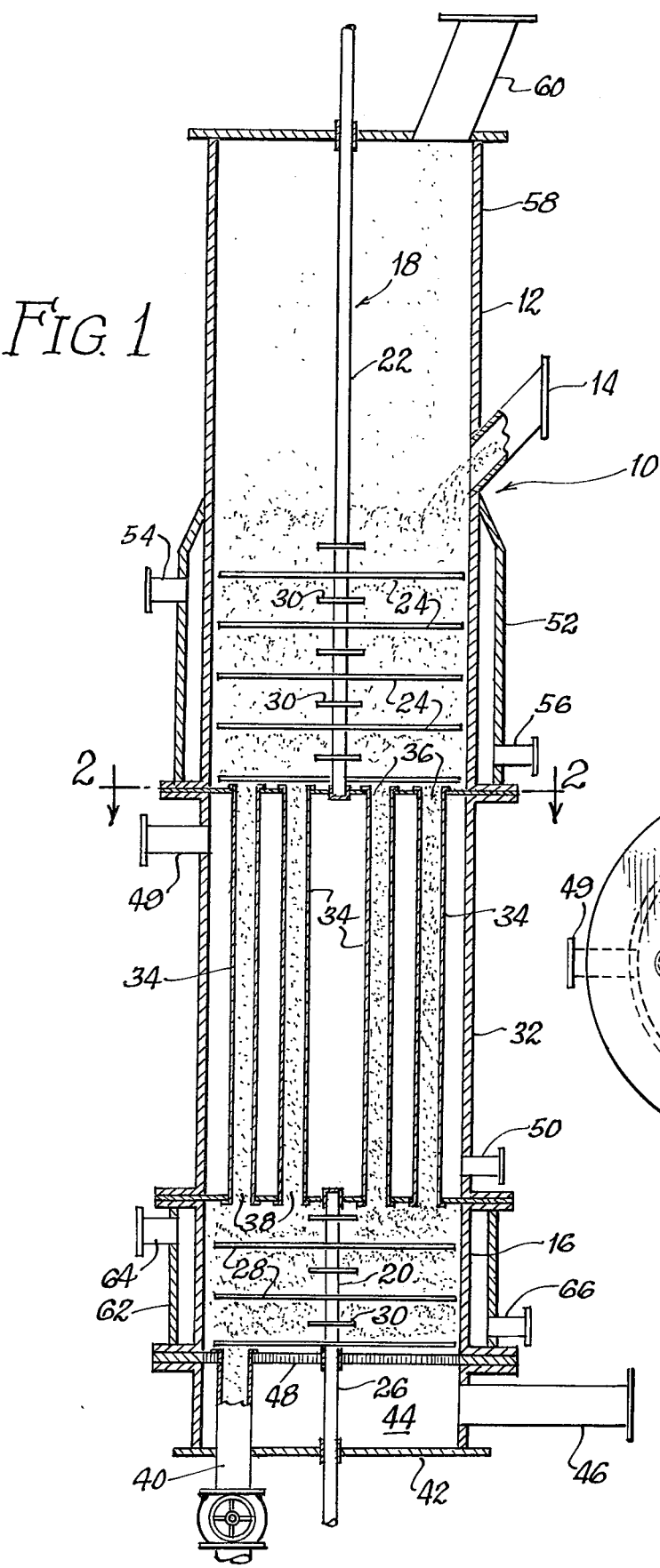

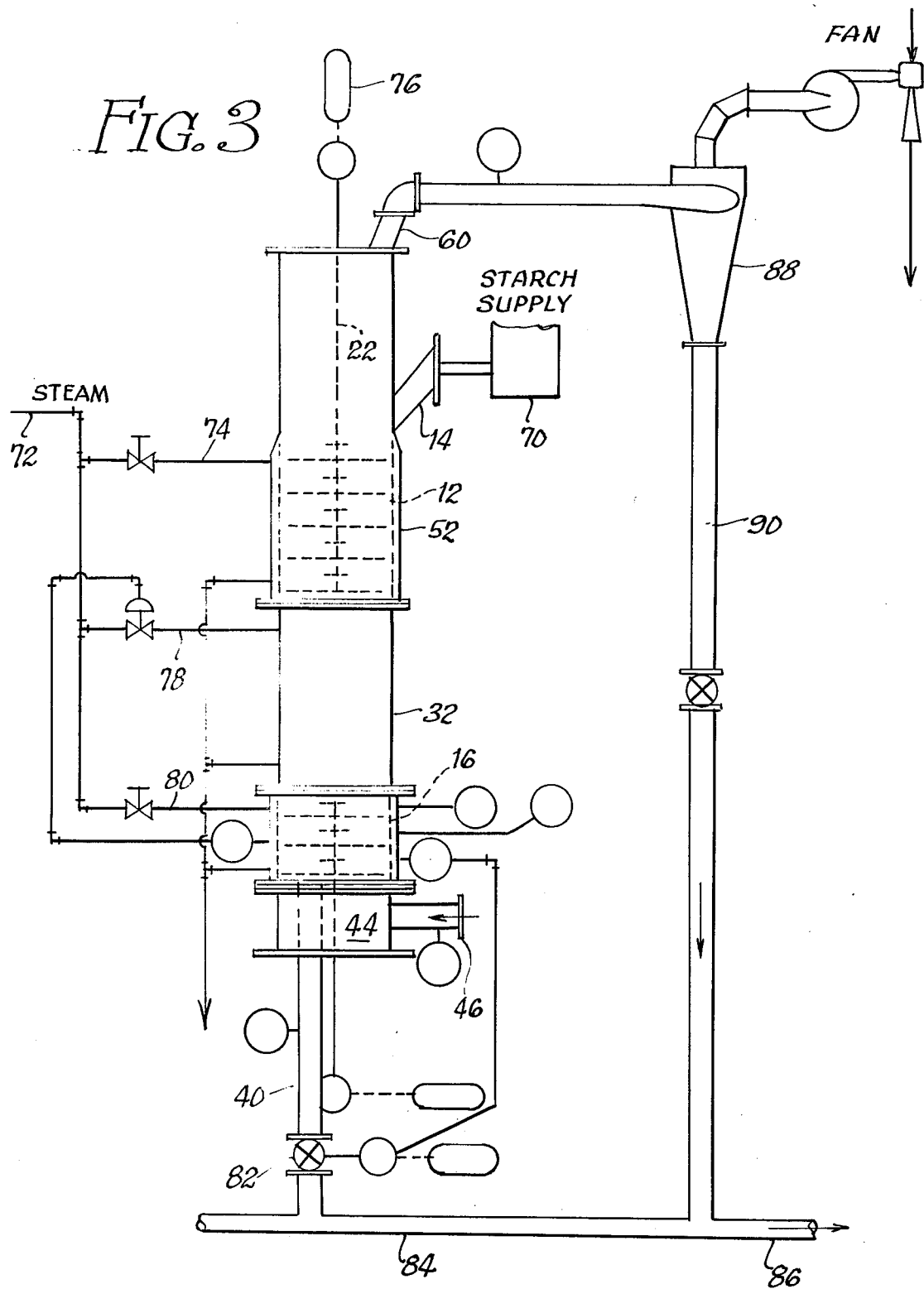

FLUIDIZATION APPARATUS

The present invention relates to a fluidization apparatus, and more particularly, to a fluidized bed apparatus for carrying out chemical reactions and/or unit operations.

Fluidized bed equipment has been used for years for a variety of purposes, including the carrying out of chemical reactions and/or unit operations such as drying. In the usual fluidized bed, a solid phase is suspended in an upwardly moving fluid stream, usually a gas stream, whereby the mass of solid particles behaves somewhat like a boiling liquid. The solid phase may be a catalyst to promote a chemical reaction in the stream of fluidizing gas, or it may be a material reactive with the fluidizing gas. Alternatively, the solid phase may be a material which is treated by the fluidizing gas as in the case of fluidized drying.

One of the primary advantages of fluidized bed systems stems from the fact that the high turbulence in a fluidized bed system provides high heat transfer characteristics. In addition, because of the high turbulence in the fluidized bed, the solids in the fluidized bed system are thoroughly mixed with the fluidizing gas to form a relatively homogeneous system.

Fluidized bed systems are, however, not without disadvantages. As is well known to those skilled in the art, the use of fluidized systems for chemical reactions frequently results in channeling, a phenomenon caused by pockets in the solid phase which results in the passage of gas through the bed without intimate contact with the solid phase.

The problem of channeling in a fluidized bed system can be partially minimized by the use of a plurality of tubular zones through which the fluidizing gas is passed in contact with the solid phase. Each tube thus operates as an individual fluidized bed with a much smaller cross sectional area. Such tubular bed systems have even greater heat transfer characteristics because the plurality of tubular zones increase the surface area available for heat transfer.

Attempts have been made in the prior art to convert starches to dextrin in a fluidized bed system. For example, in U.S. Pat. No. 2,845,368, there is described a process for the conversion of starch to dextrin in a fluidized bed system in which the fluidized reactor includes a plurality of heat transfer tubes contained in the reactor to supply heat to the starch undergoing conversion. One of the primary difficulties with a system of the type described in the foregoing patent is that the starch, when contacted with an acid catalyst, tends to form lumps within the fluidized bed reactor to thereby promote channeling, and hence, insufficient conversion of the starch to dextrin. In addition, tubular reactors used in dextrinization of starch are frequently characterized by a "dead zone" at the upper portion where the starch may lay and be subjected to high temperatures for extended periods. Auto ignition can occur, causing fire and/or explosions.

It is accordingly an object of the present invention to provide an apparatus and process for carrying out the conversion of starch to dextrin in a fluidized bed system which overcomes the foregoing disadvantages.

It is a further object of the present invention to provide a fluidized bed reactor capable of providing high heat transfer rates while minimizing channeling in the solid phase of the bed.

It is yet another object of the present invention to provide a process and apparatus for converting starch to dextrin in which the starch is efficiently converted to dextrin in the presence of an acid catalyst with relatively short residence times and high heat transfer while minimizing thermal degradation of the starch.

These and other objects of the present invention will appear more fully hereinafter, and, for purposes of illustration but not of limitation, an embodiment of the invention is shown in the accompanying drawings wherein:

FIG. 1 is a sectional view of a fluidized apparatus embodying the features of the present invention;

FIG. 2 is a partial sectional view taken along lines 2—2 in FIG. 1; and,

FIG. 3 is a schematic view of the apparatus of the present invention adapted for use in the conversion of starch to dextrin.

The concepts of the present invention reside in a fluidized bed apparatus which is formed of a single elongate, generally upstanding reactor which is divided into three sections. One is an upper chamber at the top portion of the reactor and the other is a lower chamber at the bottom portion of the reactor. Positioned between the upper and lower chambers is a section formed by a plurality of tubes each of which communicate at their upper end with the upper chamber and at their lower end with the lower chamber. The reactor also includes inlet means in the upper chamber to supply a fluidizable material to the upper chamber and outlet means in the lower chamber to remove fluidizable material from the system. The fluidizing gas is introduced through inlet means in the lower chamber and passes upwardly through the lower chamber, through the plurality of tubes and into the upper chamber while fluidizing the fluidizable material in the lower chamber, the tubes and the upper chamber.

One of the important features of the apparatus of this invention is that both the upper and lower chambers are provided with agitation means to further insure vigorous mixing in both the upper and lower chambers. In this way, channeling in the upper and lower chambers is virtually eliminated. The fluidizable material thus introduced to the upper chamber flows by gravity downwardly from the upper chamber, through the plurality of tubes and into the lower chamber from which it is discharged from the apparatus. The solid phase or fluidizable material thus flows by gravity countercurrent to the fluidizing gas, and passes slowly by gravity against the action of the suspending or fluidizing medium.

The apparatus of the present invention is ideally suited for use in the conversion of starch to dextrin. However, as will be appreciated by those skilled in the art, the apparatus of this invention is likewise suitable for a variety of other fluidized bed applications including fluidized drying, petroleum cracking operations and the like where fluidized bed systems have been used in the past. For ease of illustration, the apparatus of the invention will hereinafter be described in conjunction with the conversion of starch to dextrin, with the understanding that it may similarly be used for many other fluidized operations.

Referring now to FIG. 1, there is shown in detail a cross sectional view of the fluidized apparatus of this invention. The apparatus includes an elongate vertical housing designated as 10 which defines in its upper portion, an upper chamber 12 having inlet means 14 to supply a fluidizable material thereto. The housing 10 also defines a lower chamber 16 positioned at substantially the bottom. Both of the upper chamber 12 and the lower chamber 16 include agitator means 18 and 20, respectively. The agitator means 18 includes a shaft 22 mounted for rotation within the upper chamber 12. Mounted on shaft 22 for rotation therewith are a plurality of blades 24 which may be in the form of flat paddles rotatable with the shaft 22. The agitator means 20 in the lower chamber 16 similarly includes a rotatable shaft 26 having substantially flat blades 28 mounted for rotation therewith.

In the preferred practice of this invention, the agitating means 18 is formed with flat blades 24 at staggered locations, with additional flat blades 30 being mounted at a 90° angle between each of the blades 24. These blades present a substantially flat surface lying in a plane transverse to the direction of flow of the fluidizing gas. The agitating means 20 in the lower chamber 16 preferably has a similar configuration. If desired, some or all of the blades can be disposed at angle with respect to those illustrated.

Positioned in the housing 10 in an intermediate section 32 are a plurality of tubes 34 having an upper end 36 communicating with the upper chamber 12 and a lower end 38 communicating with the lower chamber 16. In this way, fluidizable material introduced to the inlet 14 flows by gravity downwardly through the upper chamber 12 through the plurality of tubes 34 and into the lower chamber 16. The lower chamber 16 also includes outlet means 40 to withdraw fluidizable material therefrom.

Positioned below the lower chamber 16 is a housing 42 defining a plenum chamber 44. Fluidizing gas is introduced to the plenum chamber through fluidizing gas inlet means 46, and passes through a foraminous distributor plate 48 into the lower chamber 16.

The arrangement of the tubes in the intermediate section 32 can be varied considerably. One suitable arrangement for the tubes 34 in the section 32 is shown in FIG. 2 of the drawing. As shown in this figure, the tubes 34 are arranged in a pattern about the center of the section 32.

At least the tubular section is provided with means to supply and/or remove heat therefrom. For this purpose, the section 32 preferably defines a jacket for heat exchange media which can be supplied to the section 32 by inlet means 49 and removed from the section or jacket 32 by outlet means 50 as shown in FIG. 1. It is also desirable in many instances to employ heat exchange means with the upper and lower chambers. For this purpose, it is generally sufficient to provide a jacket 52 surrounding the upper chamber 12, with the jacket 52 including inlet means 54 to supply heat exchange media to the jacket 52 and outlet means 56 to remove heat exchange media from the jacket 52.

As is shown in FIG. 1 of the drawing, it is sufficient that the heat exchange jacket 52 for the upper chamber 12 extend only up to the inlet means 14. However, it is generally preferred that the upper chamber 12 include a dome portion 58 integral therewith from which the fluidizing gas may be removed from the reactor by means of outlet means 60. As will be appreciated by those skilled in the art, not only is the fluidizing gas removed from the outlet means 60, but any "fines" entrained in the fluidizing gas are carried out with it through the outlet means 60. As will be appreciated by those skilled in the art, it is possible, and sometimes desirable, to form the upper chamber with an increased sectional area to reduce the linear velocity of the fluidizing gas to thereby assist in the separation of entrained particles of the solid phase. The cross sectional area of the dome itself may be increased, or, the cross sectional area of the entire chamber 12 may be increased for this purpose.

The lower chamber 16 may likewise be provided with heat exchange media, preferably in the form of a jacket 62, to which heat exchange media is supplied through inlet means 64 and from which the heat exchange media can be removed from outlet means 66.

The apparatus of the present invention adapted for use in the conversion of starches to dextrin is shown in FIG. 3 of the drawing. As shown in this figure, the supply of starch, preferably containing an acid catalyst, is fed from a hopper 70 to the inlet means 14 for introduction to the upper chamber 12. In the preferred practice of the invention, steam is introduced through 72 and 74 into the heat exchange jacket 52 to supply heat to the upper chamber. The shaft 22 of the agitating means 18 can be driven by suitable means 76 as shown in FIG. 3.

The catalyst-containing starch is fluidized by humid air introduced to the plenum chamber 44 through the inlet means 46 and passes upwardly through the lower chamber 16, through the tubes 34 in the intermediate section 32 and into the upper chamber 12. Steam as a heat exchange medium is also supplied through lines 78 to the jacket of section 32, and also through line 80 to the jacket 62 surrounding the lower chamber 16. In this way, the upper and lower chambers as well as the tubular section are supplied with steam to heat the starch passing therethrough.

Thus, the acidified starch supplied to the inlet means 14 is immediately fluidized in the upper chamber 12 while the upper chamber 12 is continuously agitated by the blades 24 and 30. The starch slowly flows by gravity against the action of the fluidizing medium downwardly through the upper chamber while subjected to agitation. The acidified starch continues its downward flow by gravity against the suspending action of the air through the tubes 34 in which there is no agitation, except for that which occurs naturally due to the inherent turbulence in the tubes containing the fluidized starch. After descending through the tubes 34, the starch, at least partially converted to dextrin, continues its descent into the lower chamber 16 again against the action of the heated air, and it is removed from the lower chamber 16 through the outlet means 40.

In the preferred practice of the invention, the product removed through line 40 is passed through a rotary air lock 82 into a pneumatic cooling tube where the temperature of the product is lowered to below 150°F. For this purpose, the product is discharged through the rotary air lock 82 into the cooling tube 84 and to collect equipment through line 86. Dust or fines discharged through the discharge means 60 is removed by means of a cyclone 88, and is thus transported by dust discharge line 90 to the collection equipment through line 86.

In carrying out the process of the present invention, use can be made of a wide variety of starches in the conversion of such starches to dextrin. In the preferred practice of the invention, the starch is blended with an acid catalyst, preferably HCl, for supply to the fluidized bed reactor of the invention. For this purpose, it is generally preferred to use acid in an amount ranging from 0.01 to 10.0 parts by weight of 20° Be' HCl per 1000 parts by weight of starch c.b. This corresponds approximately to average paste acidities expressed as milliequivalents of acid per gram of starch (dry bases) of 0.001 to 0.10.

The acidified starch is then passed through the apparatus while maintained at a temperature which is dependent somewhat on the type of dextrin to be produced. In general, the starch is maintained at a temperature within the range of 125°–380°F, and preferably 170°–375°F in the fluidized bed reactor. In general, the residence time of the starch in the fluidized bed reactor of this invention is less than one hour, and most frequently ranges from 10 to 30 minutes, although longer or shorter residence times may be employed depending somewhat on the grade of dextrin desired and the degree of conversion sought.

If desired, the air as the fluidizing gas may be heated, depending on the grade of dextrin to be produced. In general, the air can be heated to a temperature within the range from 85°F to 350°F. For example, when canary dextrin is to be produced, temperatures within the range of 225°–310°F are usually preferred. The air supplied as the fluidizing gas preferably contains moisture to more efficiently promote the conversion reaction. In general, the air should have a relative humidity within the range of 15 to 80%, depending, again, on the grade of dextrin to be produced and the temperature of the air. In this way, the introduction of water and/or acid catalyst directly onto the starch in the fluid bed reactor can be avoided, thereby further reducing any tendency for the starch to agglomerate.

As will be appreciated by those skilled in the art, other fluidizing media can be used. For example, steam, or inert gases such as nitrogen, carbon dioxide, etc., preferably containing some moisture can be used. In addition, flue gases from combustion operations can similarly be used as the fluidizing medium if desired. It is not essential that the fluidizing medium add any sensible heat to the starch undergoing dextrinization since the tubular section of the reactor employed with the concepts in the practice of this invention in the dextrinization of starches is capable of providing all of the heat necessary to efficiently effect the reaction.

Having described the basic concepts of the invention, reference will now be made to the following example which is provided by way of illustration of the practice in the conversion of starch to dextrin.

EXAMPLE

This example illustrates the use of a fluidized bed reactor of the type illustrated in FIGS. 1 and 3 of the drawing, having 7 tubes in the intermediate section.

An acidified starch is prepared by feeding raw starch to a covered ribbon blender to which gaseous hydrochloric acid is subsequently added. The amount of hydrochloric acid added is determined by titration and it is reported as a titer which represents the milliliters of 0.1 N NaOH required to bring 20 grams of starch slurried in 100 milliliters of distilled water to a pH of 6. The acidified starch is introduced to the fluidized bed through the inlet means 14, and air is introduced to the plenum chamber 44.

Dextrins may be characterized as either white dextrins or canary dextrins. Further, white dextrins may be either high solubles or low solubles. Solubles are reported as per cent, and represents the amount of a 2-gram sample which dissolves after being suspended in 250 milliliters of water at 25°C and shaken for 1 hour.

Canary dextrins are classified as either thick (high viscosity) or thin (low viscosity). Dextrin viscosity is normally reported as fluidity. For example, a 3:4 fluidity, such as for Test 4050 in the table below, represents the following. Three parts by weight of dextrin sample are mixed with four parts by weight of water, heated in a steam bath for 30 minutes, then cooled to 25°C. Any evaporation of water, as determined by weighing, is compensated for by addition of water. The material is then strained through a No. 5029 nylon into a glass beaker and held at 25°C for a total cooling time of 1 hour. The material is then placed in a standard funnel at 25°C. Fluidity is normally reported in units of milliliters and represents the amount of material that flows out of the standard funnel in exactly 70 seconds. The borax fluidity method is the same as that described above, except that 10% by weight of the sample is substituted with borax ($Na_2B_4O_7 \cdot 10H_2O$).

As shown in the table below a high soluble white dextrin (Test 4050), a low soluble white dextrin (Test 4060), a thin canary dextrin (Test 4064) and a thick canary dextrin (Test 4074) were produced:

| Test | 4050 | 4060 | 4064 | 4074 |
|---|---|---|---|---|
| Starch moisture, % | 10.7 | 10.7 | 10 | 11 |
| Starch titer, ml | 4.6 | 4.2 | 5.3 | 4.1 |
| Operating temperature, °F | 275 | 200 | 310 | 325 |
| Norminal retention time, minutes | 15.3 | 14.8 | 13.3 | 12.6 |
| Air rate/tube, scfm[a]/tube | 5.5 | 5.5 | 5.5 | 5.5 |
| Air velocity, feet/second[b] | 2.1 | 2.1 | 2.1 | 2.1 |
| Jacket steam pressure, psig | 55 | <5 | 112 | 150 |
| Product moisture, % | 2.5 | 5.0 | 2.2 | 1.9 |
| Product solubles, % | 94.5 | 19.8 | 98.1 | 97.9 |
| Product fluidity, ml | 22[c] | 25[d] | 16[e] | 36[f] |

[a]scfm = standard cubic feet per minute.
[b]Based on inside tube diameter of 2.834 inches.
[c]3:4 fluidity, as is.
[d]1:3 10% borax fluidity, as is.
[e]2:3 10% borax fluidity, as is.
[f]1:2 10% borax fluidity, as is.

The fluid bed apparatus contained 7 tubes, the tubes have an inside diameter of 2.834 inches. The height of each tube was 5 feet.

It will be understood that I have provided a significantly improved process and apparatus for the conversion of starch to dextrin. The use of the upper and lower agitated chambers in the fluidized bed apparatus of this invention maintains homogeneity in the fluidized bed, and prevents scorching of the starch as it is passed through the tubular section of the reactor. The process and apparatus of this invention is capable of producing high quality dextrin at low cost, without the risk of thermal degradation of the starch undergoing conversion.

It will also be understood that the apparatus of the invention can be used for other fluidized bed operations. It will be appreciated by those skilled in the art that the feed and discharge arrangements of the apparatus as described herein may be reversed whereby the material to be fluidized is fed to the bottom of the reactor and the solid material to be recovered is removed from the top of the reactor.

Various modifications and changes can be made in the details of construction, procedure, operation and use without departing from the spirit of the invention, especially as defined in the following claims.

I claim:

1. Apparatus for carrying out fluidized operations comprising an elongate generally upstanding housing, said housing defining an upper chamber, an intermediate chamber and a lower chamber, said upper and lower chambers each including agitating means therein, said agitating means including rotatable agitator blades mounted in each of said upper and lower chambers, a plurality of open ended tubes positioned in said intermediate chamber, the open ends of each of said tubes communicating the interior of said tubes with the upper and lower chambers, respectively, inlet means to supply a fluidizable material to either of said upper or lower chamber, said intermediate chamber comprising jacket means surrounding the tubes to effect heat exchange therewith, outlet means to remove fluidizable material from the other of said upper or lower chamber and means to supply a fluidizing gas to the lower chamber whereby the fluidizing gas passes upwardly through the lower chamber, through each of the tubes and into the upper chamber while fluidizing the material therein, and outlet means in said upper chamber for removing said fluidizing gas.

2. Apparatus as defined in claim 1 wherein the upper chamber includes heat transfer means surrounding the upper chamber.

3. Apparatus as defined in claim 1 wherein the lower chamber includes heat transfer means surrounding the lower chamber.

4. Apparatus as defined in claim 1 wherein the cross sectional area of each of the tubes is less than the cross sectional area of each of both the upper chamber and the lower chamber.

5. Apparatus as defined in claim 1 wherein the upper chamber further includes means exterior to said upper chamber and connected and communicating therewith to remove fine particules of the fluidizable material from said upper chamber.

6. Apparatus as defined in claim 1 wherein the agitating means includes a shaft rotatably mounted in each of the upper and lower chambers and a plurality of agitator blades mounted on the shaft for rotation therewith.

7. Apparatus as defined in claim 6 wherein the agitator blades are dimensioned to sweep substantially the entire cross section of each of the upper and lower chambers.

8. Apparatus as defined in claim 6 wherein the agitator blades have substantially flat surfaces transverse to the direction of the fluidizing gas.

9. Apparatus as defined in claim 6 wherein the agitator blades are staggered, with one blade being mounted at an orientation of 90° in relation to the adjacent upper or lower blades.

10. Apparatus for carrying out fluidized operations of cohesive solids comprising an elongate generally upstanding housing, said housing defining an upper chamber, an intermediate chamber and a lower chamber, said upper and lower chambers including agitating means therein, said agitating means including rotatable agitator blades mounted in each of said upper and lower chambers, a plurality of open ended tubes positioned in said intermediate chamber having the open ends of each of said tubes communicating the interior of said tubes with the upper and lower chambers, respectively, inlet means to supply a fluidizable material to the upper chamber, said intermediate chamber comprising jacket means surrounding the tubes to effect heat exchange therewith, outlet means to remove fluidizable material from the lower chamber and means to supply a fluidizing gas to the lower chamber whereby the fluidizing gas passes upwardly through the lower chamber, through each of the tubes and into the upper chamber while fluidizing the material therein, and outlet means in said upper chamber for removing said fluidizing gas.

11. Apparatus as defined in claim 10 wherein the agitating means includes a shaft rotatably mounted in each of the upper and lower chambers and a plurality of agitator blades mounted on the shaft for rotation therewith.

* * * * *

UNITED STATES PATENT OFFICE
CERTIFICATE OF CORRECTION

Patent No. 3,967,975  Dated July 6, 1976

Inventor(s) Leo R. Idaszak

It is certified that error appears in the above-identified patent and that said Letters Patent are hereby corrected as shown below:

Figure 1 and the figure on the title page: The numeral "48" should read -- 49 --.

Signed and Sealed this

Seventh Day of February 1978

[SEAL]

Attest:

RUTH C. MASON  
Attesting Officer

LUTRELLE F. PARKER  
Acting Commissioner of Patents and Trademarks